United States Patent
Kinnell et al.

(10) Patent No.: US 9,784,630 B2
(45) Date of Patent: Oct. 10, 2017

(54) SENSOR

(75) Inventors: Peter Kinnell, Leicestershire (GB);
Russell William Craddock, Leicestershire (GB)

(73) Assignee: GE Infrastructure Sensing, Inc., Billerica, MA (US)

(*) Notice: Subject to any disclaimer, the term of this patent is extended or adjusted under 35 U.S.C. 154(b) by 751 days.

(21) Appl. No.: 13/321,505

(22) PCT Filed: Apr. 19, 2010

(86) PCT No.: PCT/US2010/031550
§ 371 (c)(1),
(2), (4) Date: Apr. 11, 2012

(87) PCT Pub. No.: WO2010/135048
PCT Pub. Date: Nov. 25, 2010

(65) Prior Publication Data
US 2012/0198916 A1    Aug. 9, 2012

(30) Foreign Application Priority Data
May 21, 2009    (GB) .................................. 0908795.8

(51) Int. Cl.
*G01L 9/00*    (2006.01)

(52) U.S. Cl.
CPC .................. *G01L 9/0019* (2013.01)

(58) Field of Classification Search
CPC ....... G01L 7/08; G01L 9/0016; G01L 9/0042; G01L 9/001; G01L 9/0022; G01L 9/0019; G01N 9/00; G01N 9/002; H03H 9/02393
USPC .. 73/54.01, 54.24, 54.25, 54.26, 54.41, 715, 73/718, 862.09, 32 A, 504.12, 579, 702
See application file for complete search history.

(56) References Cited

U.S. PATENT DOCUMENTS

| | | | |
|---|---|---|---|
| 5,101,664 A | | 4/1992 | Hockaday et al. |
| 5,367,217 A | * | 11/1994 | Norling ................ G01L 9/0019 310/321 |
| 6,023,961 A | | 2/2000 | Discenzo et al. |
| 6,182,513 B1 | * | 2/2001 | Stemme et al. ............... 73/704 |
| 6,269,686 B1 | * | 8/2001 | Hahn et al. .................. 73/54.24 |

(Continued)

FOREIGN PATENT DOCUMENTS

| | | |
|---|---|---|
| CN | 1834615 A | 9/2006 |
| CN | 101281071 A | 10/2008 |

(Continued)

OTHER PUBLICATIONS

Bela G. Liptak, Instrument Engineers' Handbook—Process Measurement and Analysis, 2003, CRC Press LLC, Fourth Edition, p. 1073.*
GB Office Action dated Oct. 7, 2012 from corresponding Application No. 0908795.5.
GB Search Report dated Aug. 5, 2009 issued in connection with GB Patent Application No. 0908795.8 which was filed on May 21, 2009.

(Continued)

*Primary Examiner* — Daniel S Larkin
*Assistant Examiner* — Irving A Campbell
(74) *Attorney, Agent, or Firm* — GE Global Patent Operation

(57) ABSTRACT

A sensor is provided having a diaphragm. One side of the diaphragm is arranged to be exposed to a fluid, to measure a characteristic of the fluid. Two supports are mounted on the diaphragm and a resonator is provided on the supports. The proportion of energy transferred from the resonator to the diaphragm is variable for the sensor to be used either as a viscosity/density sensor or as a pressure sensor.

18 Claims, 5 Drawing Sheets

(56) References Cited

U.S. PATENT DOCUMENTS

| | | |
|---|---|---|
| 6,389,877 B1 * | 5/2002 | Takeuchi et al. ............ 73/19.03 |
| 6,886,410 B1 | 5/2005 | Wang et al. |
| 6,954,020 B2 * | 10/2005 | Ma et al. ..................... 310/309 |
| 7,017,420 B2 | 3/2006 | Kalvesten et al. |
| 7,102,467 B2 * | 9/2006 | Lutz et al. ................... 333/186 |
| 7,322,246 B2 * | 1/2008 | Miller ............................ 73/715 |
| 7,350,367 B2 | 4/2008 | Matsiev et al. |
| 2007/0063613 A1 * | 3/2007 | Elata ....................... F03G 7/06 310/306 |
| 2007/0074578 A1 * | 4/2007 | Subramanian ........ G01L 9/0019 73/716 |
| 2008/0165403 A1 * | 7/2008 | Grasshoff et al. ............ 359/199 |

FOREIGN PATENT DOCUMENTS

| | | |
|---|---|---|
| EP | 0777115 B1 | 6/1997 |
| EP | 0777116 B1 | 6/1997 |
| EP | 0950173 A1 | 10/1999 |
| GB | 2182439 A | 5/1987 |
| GB | 2229816 A | 10/1990 |

OTHER PUBLICATIONS

EP Search Report dated Jul. 29, 2010 issued in connection with PCT Application No. US10/31550 which was filed on Apr. 19, 2010.
Search Report from CN Application No. 201080023153.8 dated Feb. 25, 2013.

* cited by examiner

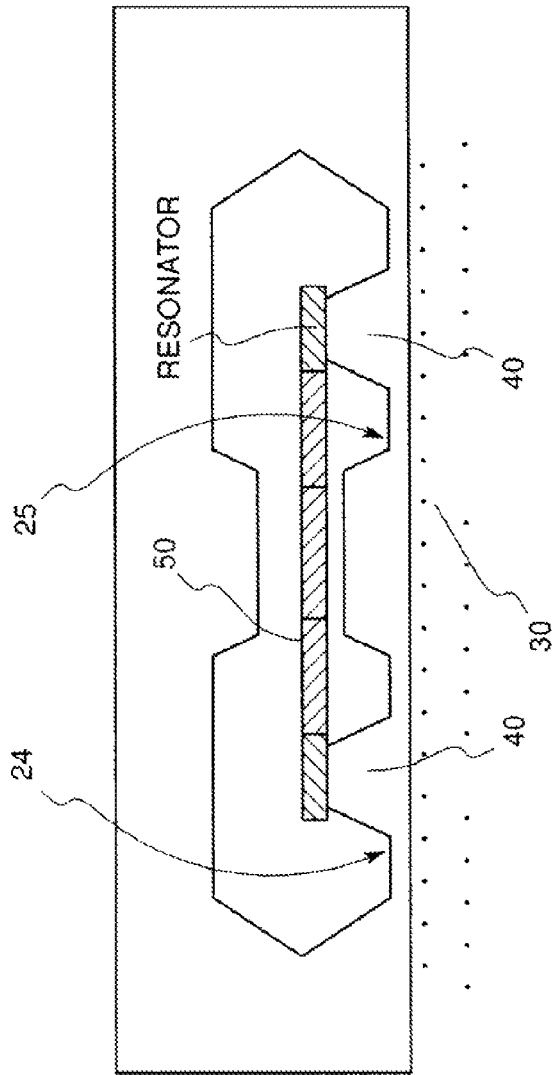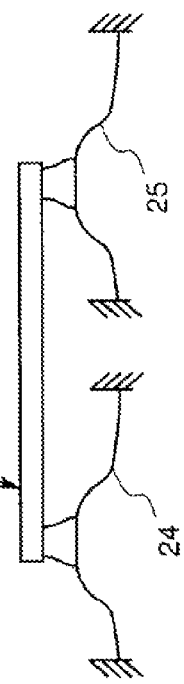

SENSOR

CROSS-REFERENCE TO RELATED APPLICATIONS

This is a national stage application filed under 35 U.S.C. §371(c) of prior-filed, co-pending PCT patent application serial number PCT/US2010/031550, filed on Apr. 19, 2010, which claim priority to British patent application serial number 0908795.8, filed on May 21, 2009, each of which is hereby incorporated by reference in its entirety.

BACKGROUND OF THE INVENTION

Field of the Invention

Embodiments of the present invention relate to a sensor, in particular a sensor arranged to measure more than one characteristic of a fluid.

Micromachined silicon sensors are known for measuring particular characteristics of fluids. For example, U.S. Pat. No. 6,269,686 discloses a micromachined sensor with a piezoelectric resonator arranged to measure the viscosity and density of a medium. U.S. Pat. No. 5,101,664 discloses a micromachined silicon sensor with a vibrating bridge arranged to measure the pressure of a fluid.

However, micromachined viscosity and pressure sensors have significant differences because of the different ways in which they operate. Viscosity sensors are designed to impart a relatively large amount of energy from a resonator into a medium to increase viscosity sensitivity, whereas a pressure sensor is designed to impart as little energy as possible from the resonator into the medium to increase pressure sensitivity.

It would be desirable to have a sensor which is able to sense viscosity and/or pressure so that multiple sensor devices are not required.

SUMMARY OF THE INVENTION

According to a first aspect of the present invention there is provided a sensor comprising: a diaphragm, one side of which is arranged to be exposed to a medium: one or more supports mounted on the diaphragm: and a resonator provided on the one or more supports, wherein the proportion of energy transferred from the resonator to the diaphragm is variable.

As the amount of energy transferred from the resonator to the diaphragm is adjustable, it may be varied to increase the amount of energy imparted to the medium for sensing viscosity or it may be tuned to reduce the amount of energy imparted to the medium for sensing pressure.

The proportion of energy transferred may be varied by adjusting the mechanical coupling between the resonator and the diaphragm, for example by actuating an actuator to physically alter or stretch the resonator or to selectively operate the resonator in a different way.

A controller may be provided for determining the viscosity or pressure of the medium based on movement of the excited resonator when the diaphragm is exposed to the fluid.

The diaphragm, supports and resonator may be fabricated on a wafer, such as a silicon wafer, using "micro machining" processes that selectively etch away parts of the wafer. Devices formed by such fabrication techniques may be termed micromachined or "Micro-Electro-Mechanical Systems" (MEMS). The diaphragm, supports and resonator may be only a few millimeters across (such as 5 millimeters, 3 millimeters or even 1 millimeter across) enabling them to be used to determine the viscosity or pressure of a fluid from a very small sample.

The resonator may be on the opposite side of the diaphragm from the medium under test, to protect it from damage, wear, corrosion etc caused by the medium which may otherwise affect or damage the sensitive components. The sensor is thus robust.

According to a second aspect of the present invention, there is provided a method of operating a sensor for selectively sensing viscosity/density or pressure of a medium, the sensor including a diaphragm arranged to be exposed to the medium, one or more supports mounted on the diaphragm and a resonator provided on the supports, the method comprising selecting the proportion of energy transferred from the resonator to the diaphragm dependent upon whether viscosity/density or pressure of the medium is to be sensed.

BRIEF DESCRIPTION OF THE DRAWINGS

Embodiments of the present invention will now be described, by way of example only, with reference to the accompanying drawings, in which:

FIGS. 4 to 6 illustrate further embodiments of a sensor illustrating the present invention arranged to reduce the effects of pressure of the fluid under test on the viscosity measurements.

DETAILED DESCRIPTION OF THE INVENTION

Figure 1:
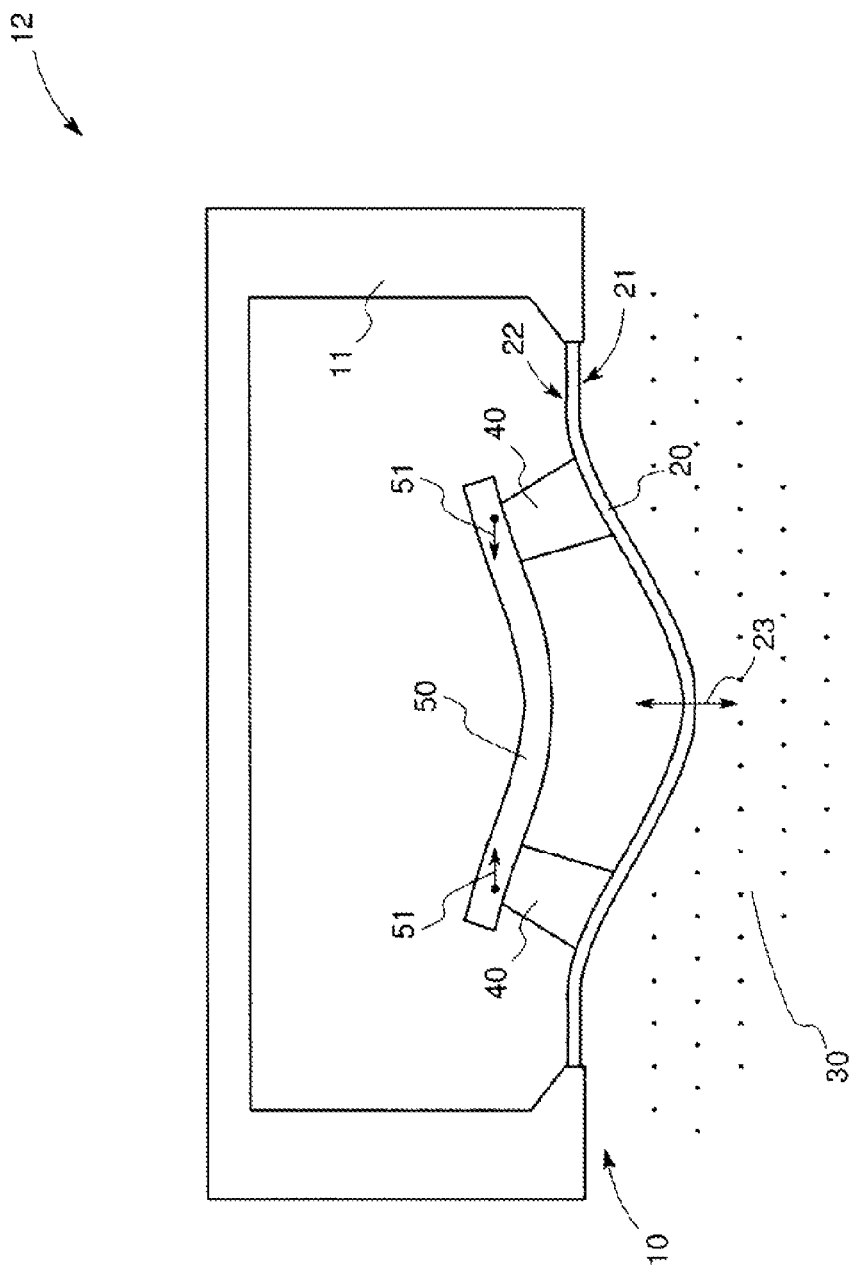
FIG. 1 shows a side view of a sensor illustrating an embodiment of the present invention.

FIG. 1 illustrates a sensor 10 having a diaphragm 20, with a first side 21 which, in use, is exposed to a fluid 30, a characteristic of which is to be measured. Two supports 40 or "mesas" are mounted on the second opposite side 22 of the diaphragm 20 from that to which the fluid 30 is exposed. A resonator 50, which in this example comprises one or more beams illustrated in more detail later, is provided on the supports 40. The amount of energy transferred from the resonator 50 to the diaphragm 20 is variable to increase the amount of energy imparted to the medium for sensing viscosity or to reduce the amount of energy transferred for sensing pressure. Various ways of varying the amount of energy transferred are discussed in detail later.

A housing 11 is provided around the supports 40 and resonator 50 and in this example provides a vacuum cavity 12 bounded by the housing 11 and diaphragm 20. The vibration of the resonator 20 is driven by a suitable electrical input, typically via an AC driving signal using for example an electrostatic comb drive, a magnetic drive, a piezoelectric drive or the like as is well known in the art (not shown). An electrical output from the resonator is also provided from which variations in the vibration of the resonator may be determined and the viscosity/density or pressure of the fluid exposed to the first 21 side of the diaphragm may be inferred using a suitable controller such as a microprocessor or suitable electronic circuits or logic.

As can be seen from the exaggerated example provided for clarity in FIG. 1, movement of the resonator 50 during use causes bending moments 51 in the resonator 50 which produce reaction forces on the supports 40 which in turn cause the diaphragm 20 to deflect. When more energy is transferred from the resonator 50 to the diaphragm 20, the diaphragm 20 vibrates at a similar frequency to the frequency to the resonator 50 and it undergoes larger deflections resulting in more energy being transferred to the fluid and producing better viscosity and density measurements. The movement of the diaphragm 20 in the fluid under test 30 (illustrated by arrow 23) causes energy loss from the resonator 50 and therefore a reduction in the resonator Quality Factor. By monitoring the Quality Factor of the resonator, the viscosity of the fluid may be determined. The viscosity of the media may be determined in a controller, such as a microprocessor, based on a previous Quality Factor calibration using results from fluids of known viscosity. The viscosity may be inferred, for example using a suitable algorithm or by using a look-up table. Density may additionally or alternatively be measured by monitoring the resonant frequency of the resonator. This will be changed as a result of mass loading on the diaphragm 20 effectively increasing the mass of the resonator. The density of the media may be determined in a controller, such as a microprocessor.

When measuring the pressure of the fluid under test 30, the resonator is operated such that less energy is transferred from the resonator 50 to the diaphragm 20. Consequently, far less energy is transferred to the fluid 30 and more precise pressure measurements are obtained since the pressure of the fluid is not affected by movement of the diaphragm. The pressure is typically inferred by the pressure applied by the fluid 30 flexing the diaphragm 20 which stretches the resonator 50 altering the frequency at which it vibrates. By measuring the resultant frequency, the pressure of the fluid 30 acting against the diaphragm 20 is inferred in a controller such as a microprocessor, typically via an appropriate algorithm or look-up table.

Figure 2:
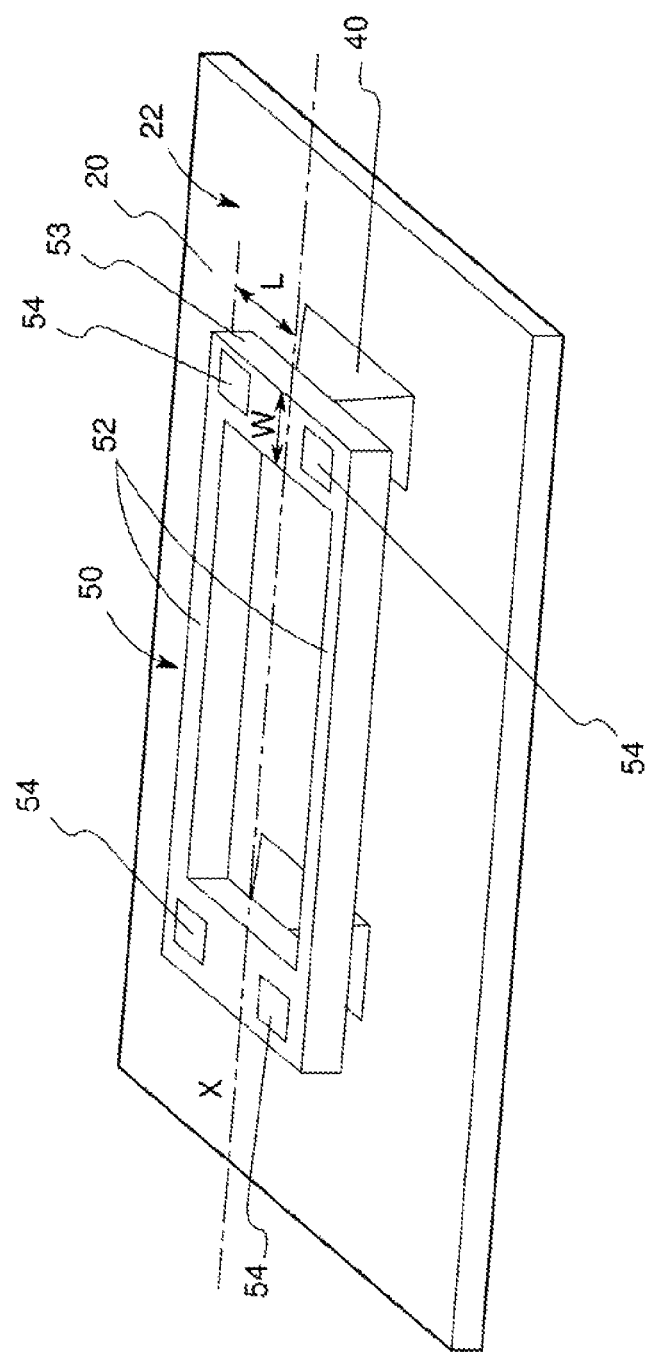
FIG. 2 shows a perspective view of the diaphragm and resonator of the sensor shown in FIG. 1.

FIG. 2 illustrates a perspective view of the resonator 50, supports 40 and the second side 22 of the diaphragm 20. As can be seen, the resonator 50 in this example comprises two resonator beams 52, each supported at either end by a perpendicular mounting portion 53 provided on each of the supports 40. It has been found that varying the physical properties of the resonator, in particular the beams 52 or mounting portions 53, changes the mechanical coupling between the resonator beams 52 and supports 40 which in turn affects the bending moments 51 on the supports 40 and the energy transferred from the resonator 50 to the diaphragm 20. The resonator may be stretched to adjust the energy transfer using one or more actuators 54. The actuators 54 may, for example, be thermal actuators 54 that stretch the mounting portions 53 to adjust the resonant frequency, moving it closer in frequency to that of the diaphragm and so increase the energy transferred from the resonator 50 to the diaphragm 20 and fluid 30 increasing sensitivity when used as a viscosity sensor. It has been found that when a relatively large amount of energy is transferred from the resonator to the fluid 30, the sensor provides high sensitivity for use in sensing the viscosity of low viscous fluids such as gases. The actuator could be a thermal actuator, piezoelectric actuator or electrostatic actuator for example. The width W of the perpendicular mounting portions 53 could alternatively or additionally be varied, for example by the actuator 54 or another actuator to affect the bending moments 51 and so the energy transferred from the resonator to provide better viscosity sensitivity.

Figure 3:
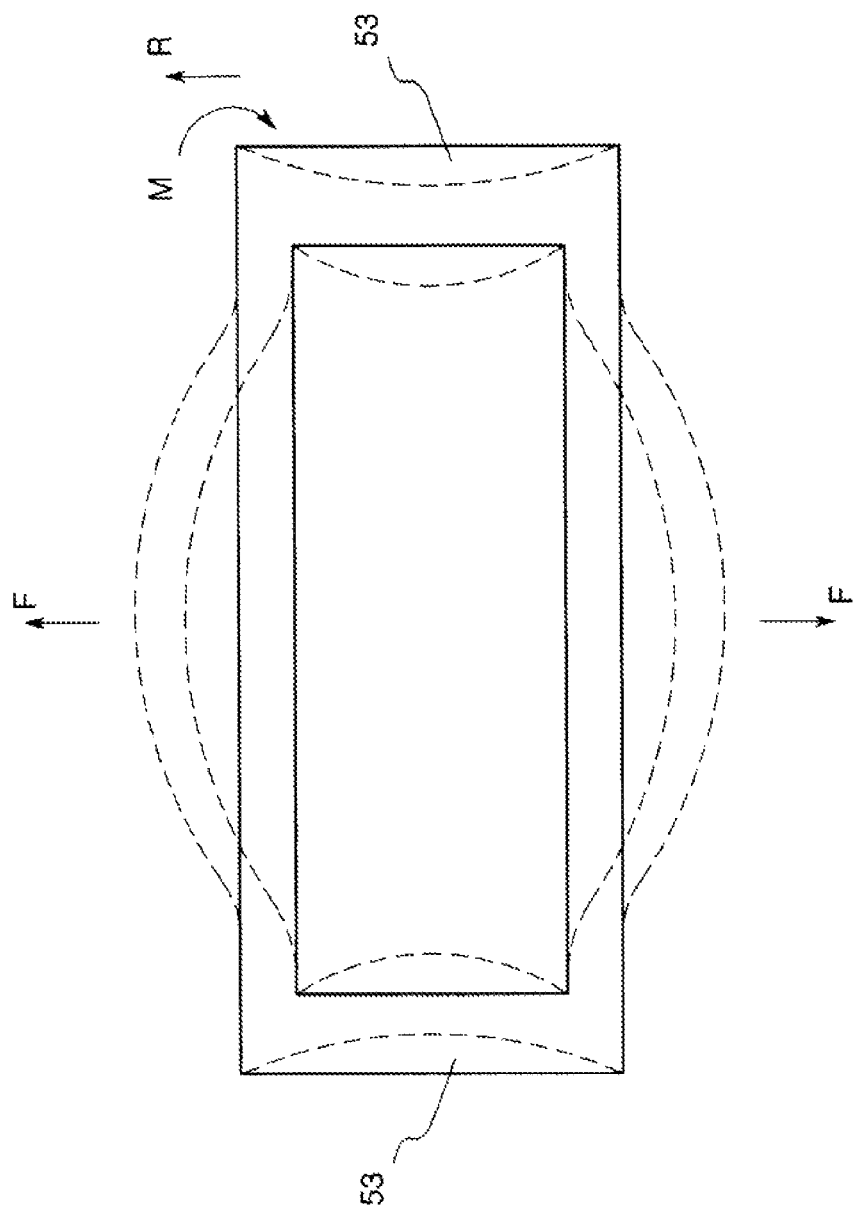
FIG. 3 shows a top view of the resonator shown in FIGS. 1 and 2, with movement of the resonator illustrated by dashed lines.

FIG. 3 shows a top view of the resonator 50 further illustrating the reaction forces to which the supports 40 are subjected due to the movement of the resonator beams 52. The resonator beams 52 are driven by a suitable driving signal illustrated by arrows F into positions represented by dashed lines. The movement of the resonator beams 52 causes a reaction moment M in the perpendicular mounting portions 53 which causes the fixing positions of the supports 40 to be moved as also shown by dashed lines. As explained previously, these moments M and reaction forces R on the supports 40 cause the diaphragm to deflect.

The resonator beams 52 are shown as being moved in opposite or anti-phase directions in FIG. 3, reducing the amount of energy transferred into the diaphragm 20 and fluid 30 for use as a pressure sensor. However, if the beams 52 are moved in-phase, then this increases the coupling forces between the resonator 50 and diaphragm 20, bringing the frequency of the resonator 50 closer to that of the diaphragm 20 and imparting more energy into the diaphragm and fluid for greater sensitivity to viscosity and density.

Figure 6:
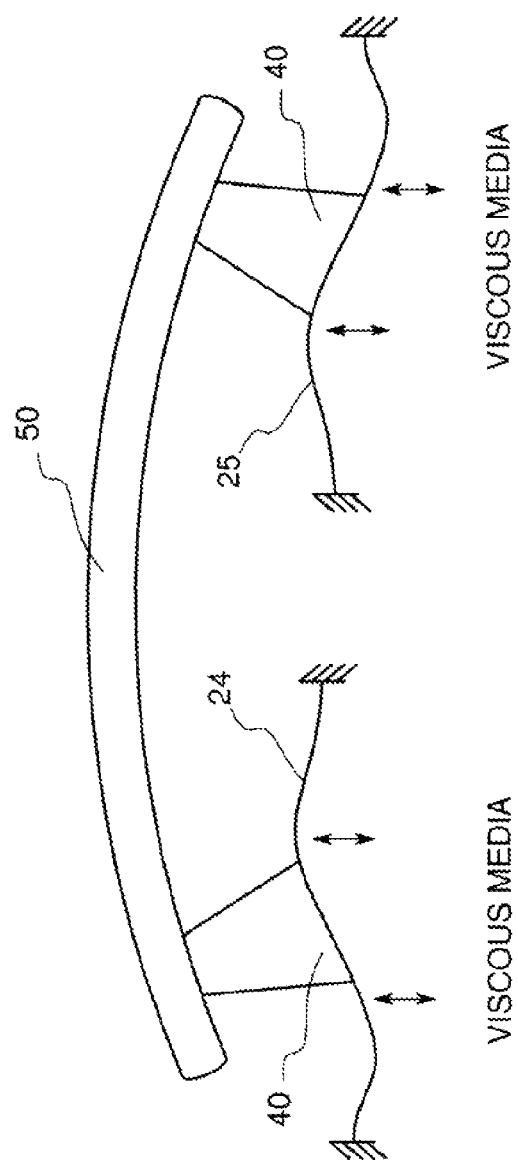

FIGS. 4 to 6 illustrate an arrangement of the sensor which reduces the effect of pressure sensitivity on the diaphragm providing even more precise viscosity measurements. As can be seen, the embodiments of FIGS. 4 to 6 include each of the two supports 40 provided on a separate diaphragm 24, 25, with each diaphragm 24, 25 exposed to the same fluid under test 30. The resonator 50 is supported by supports 40 and is free to vibrate as before. The provision of two diaphragms 24, 25 cancels out the effect of the pressure of the fluid under test on the diaphragm. For example, as illustrated in FIG. 5 the fluid under test 30 may cause the diaphragms 24, 25 to be stretched resulting in rotation of the supports 40 caused by the pressure. Since the effects of pressure are applied equally to each of the two diaphragms 24, 25, the resonator 50 is moved up equally by each of the diaphragms 24, 25 as shown in FIG. 5 eliminating the effect of the pressure of the fluid under test so that resulting measurements are indicative of the viscosity of the fluid and not the pressure. Thus, far more precise viscosity measurements are obtained.

FIG. 6 illustrates diaphragm deflections that would be created as a result of the resonator 50 being arranged to transfer a large proportion of energy to the diaphragms 24, 25 for viscosity/density measurements. The resonator 50 induced reaction forces imparted on the supports 40 cause the diaphragms 24, 25 to form 'S' shapes that move in viscous media to reduce the resonator Q-factor, from which viscosity measurements may be inferred.

Various modifications may be made to the examples described above without departing from the present invention. For example, the proportion of energy transferred to the diaphragm may be varied using a suitable actuator, such as a thermal, electrostatic or piezoelectric actuator and/or by vibrating beams of the resonator substantially in-phase or out of phase.

What is claimed is:
1. A sensor comprising:
a diaphragm, one side of which is arranged to be exposed to a medium;
one or more supports mounted on the diaphragm;
a resonator provided on the one or more supports,
wherein the resonator comprises at least two beams supported at each end by a perpendicular mounting portion connecting the at least two beams, wherein the perpendicular mounting portion is provided on the one or more supports; and at least one actuator coupled to the resonator and configured to cause at least one bending moment in the resonator in order to produce reaction forces on the supports and cause the diaphragm to deflect, thereby transferring energy from the resonator to the diaphragm and the medium, the sensor to selectively sense viscosity/density or pressure of a medium, wherein the proportion of energy transferred from the resonator to the diaphragm is variable dependent upon whether viscosity/density or pressure of a medium is to be sensed, wherein the proportion of energy transferred is arranged to be varied by actuating at least a first and a second actuator, wherein the first actuator is configured to cause bending of the at least two beams and the second actuator is configured to vary the width of the perpendicular mounting portion.

2. A sensor according to claim 1, wherein the proportion of energy transferred is arranged to be variable by varying the mechanical coupling between the resonator and the one or more supports.

3. A sensor according to claim 2, wherein the mechanical coupling between the resonator and the one or more supports is variable under control by an electrical signal.

4. A sensor according to claim 2, wherein the mechanical coupling is arranged to be varied by operating the resonator such that the beams are selected to vibrate either in-phase or out of phase.

5. A sensor according to claim 1, wherein the proportion of energy transferred is arranged to be varied by actuating the at least one actuator.

6. A sensor according to claim 5, wherein the actuator is arranged to stretch a portion of the resonator.

7. A sensor according to claim 5, wherein the actuator is a thermal actuator.

8. A sensor according to claim 5, wherein the actuator is configured to vary the width of the perpendicular mounting portion.

9. A sensor according to claim 8, wherein the actuator is further configured to vary the beams.

10. A sensor according to claim 1, further comprising a controller configured to determine a characteristic of a fluid exposed to the diaphragm based on measurements of the movement of the resonator when the diaphragm is exposed to the fluid.

11. A sensor according to claim 1, wherein the medium is only exposed to one side of the diaphragm and the one or more supports and resonator are on the opposite side of the diaphragm.

12. A sensor according to claim 1, wherein the one or more supports is at least two supports and wherein each of at least two supports is mounted on a first side of a separate diaphragm, with a second opposite side of each diaphragm arranged to be exposed to the same fluid, the viscosity of which is to be measured.

13. A sensor according to claim 12, where each of the separate diaphragms are configured to act upon the resonator equally.

14. A method of operating a sensor for selectively sensing viscosity/density or pressure of a medium, the sensor comprising a diaphragm arranged to be exposed to the medium, one or more supports mounted on the diaphragm, a resonator provided on the one or more supports, wherein the resonator comprises at least two beams supported at each end by a perpendicular mounting portion connecting the at least two beams, wherein the perpendicular mounting portion is provided on the one or more supports, at least one actuator coupled to the resonator, and a controller, the method comprising:

selecting the proportion of energy transferred from the resonator to the diaphragm and the medium dependent upon whether viscosity/density or pressure of the medium is to be sensed;

activating the at least one actuator to cause a bending moment in the resonator in order to produce reaction forces on the one or more supports and cause the diaphragm to deflect, thereby transferring the selected portion of energy from the resonator to the diaphragm and the medium, wherein the actuator causes a bending moment in the perpendicular mounting portion of the resonator.

15. A method according to claim 14, wherein more energy is selected to be transferred from the resonator to the diaphragm when viscosity/density of the medium is sensed than when pressure of the medium is sensed.

16. A method according to claim 14, wherein the proportion of energy transferred is varied by adjusting the mechanical coupling between the resonator and the supports.

17. A method according to claim 14, wherein the proportion of energy transferred is varied by actuating an actuator.

18. A method according to claim 14, wherein the proportion of energy transferred is varied by operating the resonator such that the beams are selected to vibrate either in-phase or out of phase.

* * * * *